United States Patent
Chung et al.

(10) Patent No.: US 9,715,251 B2
(45) Date of Patent: Jul. 25, 2017

(54) PORTABLE DEVICE

(71) Applicant: Samsung Electronics Co., Ltd, Suwon-si, Gyeonggi-do (KR)

(72) Inventors: Won-seok Chung, Seoul (KR); Zion Kwon, Miryang-si (KR); Chang-ho Lee, Seoul (KR); Han-kyung Ji, Goyang-si (KR); Se-hun Oh, Seoul (KR); Yeo-wan Yun, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 25 days.

(21) Appl. No.: 13/940,538

(22) Filed: Jul. 12, 2013

(65) Prior Publication Data

US 2014/0063712 A1 Mar. 6, 2014

(30) Foreign Application Priority Data

Aug. 28, 2012 (KR) ........................ 10-2012-0094550
Mar. 28, 2013 (KR) ........................ 10-2013-0033770

(51) Int. Cl.
*G06F 1/16* (2006.01)

(52) U.S. Cl.
CPC ............ *G06F 1/1637* (2013.01); *G06F 1/162* (2013.01); *G06F 1/1615* (2013.01); *G06F 1/1643* (2013.01); *G06F 1/1679* (2013.01); *G06F 1/1681* (2013.01); *G06F 1/1683* (2013.01)

(58) Field of Classification Search
CPC .................................................... G06F 1/1637
USPC .................................................... 361/679.09
See application file for complete search history.

(56) References Cited

U.S. PATENT DOCUMENTS

| | | | | |
|---|---|---|---|---|
| 5,085,394 A | * | 2/1992 | Torii | G06F 1/1616 248/455 |
| 5,168,426 A | * | 12/1992 | Hoving | G06F 1/1681 16/361 |
| 5,209,448 A | * | 5/1993 | Hatanaka | G06F 1/1616 248/286.1 |
| 5,268,817 A | * | 12/1993 | Miyagawa | G06F 1/1618 361/679.06 |
| 5,345,362 A | * | 9/1994 | Winkler | A61N 1/37235 248/456 |
| 5,436,954 A | * | 7/1995 | Nishiyama | G06F 3/0236 16/349 |

(Continued)

FOREIGN PATENT DOCUMENTS

| | | |
|---|---|---|
| EP | 1 645 939 | 4/2006 |
| WO | 2012/002116 | 1/2012 |

OTHER PUBLICATIONS

Extended European Search report mailed May 20, 2015 in corresponding European Application No. 13176707.1-1959.

*Primary Examiner* — Courtney Smith
*Assistant Examiner* — Rashen E Morrison
(74) *Attorney, Agent, or Firm* — Staas & Halsey LLP

(57) ABSTRACT

A portable device includes a keyboard unit; a display unit; a connection unit which is connected to each of the keyboard unit and the display unit, moves relatively with respect to each of the keyboard unit and the display unit, and supports the display unit so that the display unit covers or uncovers the keyboard unit; and a controller which is placed inside the connection unit and controls operation of the portable device.

15 Claims, 13 Drawing Sheets

(56) References Cited

U.S. PATENT DOCUMENTS

| | | | | |
|---|---|---|---|---|
| 6,778,196 B2* | 8/2004 | Nakamura | G06F 1/1616 | 345/680 |
| 6,903,927 B2* | 6/2005 | Anlauff | G06F 1/162 | 341/22 |
| 6,926,130 B2* | 8/2005 | Skowronski | H02G 11/02 | 191/12.2 R |
| 6,961,234 B2* | 11/2005 | Tanaka | F16M 11/10 | 248/460 |
| 6,980,423 B2* | 12/2005 | Tanaka | G06F 1/162 | 248/917 |
| 7,035,090 B2* | 4/2006 | Tanaka | G06F 1/162 | 345/169 |
| 7,099,150 B2* | 8/2006 | Lee | G06F 1/1632 | 248/923 |
| 7,184,263 B1* | 2/2007 | Maskatia | G06F 1/1616 | 248/917 |
| 7,206,196 B2* | 4/2007 | Ghosh | G06F 1/162 | 248/917 |
| 7,273,089 B2* | 9/2007 | Hata | G06F 1/1616 | 165/104.33 |
| 7,551,426 B2* | 6/2009 | Huang | G06F 1/162 | 361/679.02 |
| 7,566,033 B2* | 7/2009 | Schwager | G06F 1/162 | 248/125.9 |
| 7,611,113 B2* | 11/2009 | Lai | G06F 1/1616 | 248/286.1 |
| 7,652,873 B2* | 1/2010 | Lee | E05B 65/006 | 248/917 |
| 7,876,554 B2* | 1/2011 | Chou | G06F 1/1616 | 248/65 |
| 7,940,522 B2* | 5/2011 | Solomon | G06F 1/1632 | 248/917 |
| 8,035,963 B2* | 10/2011 | Ladouceur | G06F 1/1616 | 361/679.55 |
| 8,185,170 B2* | 5/2012 | Itoh | G06F 1/1616 | 455/566 |
| 8,233,276 B2* | 7/2012 | Wu | H05K 7/00 | 345/168 |
| 8,248,788 B2* | 8/2012 | Wu | H05K 5/02 | 345/168 |
| RE43,810 E * | 11/2012 | Kim | G06F 1/1613 | 345/649 |
| 8,310,823 B2* | 11/2012 | Stoltz | G06F 1/1616 | 361/679.08 |
| 8,405,978 B2* | 3/2013 | Okutsu | G06F 1/1643 | 16/326 |
| 8,467,184 B2* | 6/2013 | Chen | G06F 1/162 | 361/679.55 |
| 8,520,374 B2* | 8/2013 | Lin | G06F 1/162 | 248/917 |
| 8,520,377 B2* | 8/2013 | Senatori | G06F 1/1616 | 361/679.26 |
| 8,654,520 B2* | 2/2014 | Lin | G06F 1/1624 | 361/679.02 |
| 8,687,360 B2* | 4/2014 | Nakada | G06F 1/1616 | 312/223.1 |
| 8,769,772 B2* | 7/2014 | Griffin | H04M 1/0216 | 16/354 |
| 8,913,380 B2* | 12/2014 | Enomoto | G06F 1/1632 | 361/679.41 |
| 8,917,498 B2* | 12/2014 | Mai | G06F 1/1616 | 361/679.02 |
| 8,937,803 B2* | 1/2015 | Hung | G06F 1/1632 | 361/679.08 |
| 2003/0144036 A1* | 7/2003 | Ito | H04M 1/0218 | 455/566 |
| 2004/0090742 A1* | 5/2004 | Son | G06F 1/1626 | 361/679.09 |
| 2005/0052833 A1* | 3/2005 | Tanaka | G06F 1/162 | 361/679.21 |
| 2005/0128695 A1* | 6/2005 | Han | G06F 1/162 | 361/679.55 |
| 2005/0135049 A1* | 6/2005 | Huang | G06F 1/1632 | 361/679.09 |
| 2005/0207112 A1* | 9/2005 | Bakker | G06F 1/1632 | 361/679.41 |
| 2005/0221865 A1* | 10/2005 | Nishiyama | G06F 3/0236 | 455/566 |
| 2007/0030634 A1* | 2/2007 | Maskatia | G06F 1/1616 | 361/679.27 |
| 2007/0060217 A1* | 3/2007 | Kim | H04M 1/0218 | 455/575.3 |
| 2007/0223184 A1 | 9/2007 | Garrett | | |
| 2008/0024975 A1* | 1/2008 | Huang | G06F 1/162 | 361/679.44 |
| 2009/0244009 A1* | 10/2009 | Staats | G06F 1/162 | 345/168 |
| 2011/0009174 A1* | 1/2011 | Ladouceur | H04M 1/0216 | 455/575.3 |
| 2011/0194238 A1* | 8/2011 | Song | G06F 1/1616 | 361/679.08 |
| 2012/0044624 A1* | 2/2012 | Hoffman | G06F 1/1628 | 361/679.21 |
| 2013/0155596 A1* | 6/2013 | Sun | G06F 1/1632 | 361/679.21 |
| 2014/0140557 A1* | 5/2014 | Miller | H04R 5/00 | 381/333 |
| 2014/0153176 A1* | 6/2014 | Ashcraft | G06F 1/166 | 361/679.21 |

* cited by examiner

PORTABLE DEVICE

CROSS-REFERENCE TO RELATED APPLICATIONS

This application claims the benefit under 35 U.S.C. §119(a) from Korean Patent Applications No. 2012-0094550 filed Aug. 28, 2012 and No. 2013-0033770 filed Mar. 28, 2013 in the Korean Intellectual Property Office, the disclosures of which are incorporated herein by reference in their entirety.

BACKGROUND OF THE INVENTION

1. Field of the Invention

The present disclosure relates to a portable device. More particularly, the present disclosure relates to a portable device that can be used like a notebook computer or a tablet computer depending on user selection.

2. Description of the Related Art

Notebook computers and tablet computers are well-known portable devices. Generally, the notebook computer has an advantage of fast text input by using a keyboard, and the tablet computer has an advantage of a more compact appearance by using a touch screen instead of the keyboard.

Recently, new types of portable devices which include advantages of both the notebook computer and tablet computer by being designed to be used like the notebook computer or the tablet computer, depending on the user selection, are being launched.

The new types of portable devices are equipped with a display unit with a touch screen. The touch screen is provided to be touchable by a user even when the portable device is used like the notebook computer as well as when the portable device is used like the tablet computer. Accordingly, when the portable device is used like the notebook computer, ways which can stably support the display unit so that the display unit is not moved even if the user touches the touch screen are required.

In addition, as general electronic products, the above-described new types of portable devices require ways to protect internal electronic components thereof from heat by improving heat radiation performance thereof.

SUMMARY OF THE INVENTION

The present disclosure has been developed in order to overcome the above drawbacks and other problems associated with the conventional arrangement. An exemplary embodiment of the present disclosure relates to a new type of portable device that can stably support a display unit and has an improved heat radiation performance.

Additional features and utilities of the present general inventive concept will be set forth in part in the description which follows and, in part, will be obvious from the description, or may be learned by practice of the general inventive concept.

Exemplary embodiments of the present disclosure can substantially be achieved by providing a portable device, which may include: a keyboard unit; a display unit; a connection unit which is connected to each of the keyboard unit and the display unit, moves relatively with respect to each of the keyboard unit and the display unit, and supports the display unit so that the display unit covers or uncovers the keyboard unit; and a controller which is placed inside the connection unit and controls operation of the portable device.

The display unit may be placed in a first arrangement to cover the keyboard unit or a second arrangement to uncover the keyboard unit depending on user selection.

A touch screen may be equipped in a front surface of the display unit, and, when the display unit is placed in the first arrangement and the second arrangement, the touch screen may be maintained in a viewable state.

The connection unit may be connected to the keyboard unit and can be rotated around a first rotation axis, and the display unit may be connected to the connection unit and can be rotated around a second rotation axis parallel to the first rotation axis.

The connection unit may be hinge-connected to the keyboard unit, and the display unit may be hinge-connected to the connection unit.

When the display unit is placed in the second arrangement, the connection unit may be placed inclinedly with respect to the keyboard unit so that external surfaces of the connection unit are exposed externally.

The keyboard unit may include a receiving groove to receive the connection unit when the connection unit is placed in the first arrangement.

The keyboard unit may include a receiving hole which receives the connection unit when the connection unit is placed in the first arrangement, and may have open top and bottom surfaces.

A top surface of the keyboard unit may include at least one fixing groove in which a lower end of the display unit is inserted when the display unit is placed in the second arrangement.

The at least one fixing groove may include a first fixing groove in which a left lower end of the display unit is inserted and a second fixing groove in which a right lower end of the display unit is inserted.

The keyboard unit may be divided into a first area and a second area in a direction parallel to the keyboard unit and vertical to the first rotation axis, the first area may be equipped with input keys of the keyboard unit, and the second area may not be equipped with the input keys, and the at least one fixing groove may be placed at a boundary area between the first area and the second area.

The second arrangement of the display unit may include a front viewing arrangement in which the touch screen can be viewed from a front side of the portable device, and a rear viewing arrangement in which the touch screen can be viewed from a rear side of the portable device.

When the display unit is switched from the front viewing arrangement to the rear viewing arrangement or when the display unit is switched from the rear viewing arrangement to the front viewing arrangement, the controller may reverse the top and bottom of an image that is being displayed on the touch screen.

When the display unit is placed in the rear viewing arrangement, a rear surface of the display unit may be in contact with a rear surface of the connection unit.

One end of the connection unit may be connected to an end of the keyboard unit, and the other end of the connection unit may be connected to a center portion of a rear surface of the display unit.

The controller may include an interface unit configured to perform interfacing with the keyboard unit and the display unit; a storage unit configured to store programs required for the operation of the portable device; and a calculation unit configured to execute the programs to control the operation of the portable device.

The connection unit may include at least one input and output port to send and receive data with at least one external device.

Other utilities and salient features of the present disclosure will become apparent from the following detailed description, which, taken in conjunction with the annexed drawings, discloses preferred embodiments.

BRIEF DESCRIPTION OF THE DRAWINGS

These and/or other aspects and advantages of the present disclosure will become apparent and more readily appreciated from the following description of the embodiments, taken in conjunction with the accompanying drawings of which.

Throughout the drawings, like reference numerals will be understood to refer to like parts, components and structures.

DETAILED DESCRIPTION OF THE PREFERRED EMBODIMENTS

Hereinafter, certain exemplary embodiments of the present disclosure will be described in detail with reference to the accompanying drawings.

The matters defined herein, such as a detailed construction and elements thereof, are provided to assist in a comprehensive understanding of this description. Thus, it is apparent that exemplary embodiments may be carried out without those defined matters. Also, well-known functions or constructions are omitted to provide a clear and concise description of exemplary embodiments. Further, dimensions of various elements in the accompanying drawings may be arbitrarily increased or decreased for assisting in a comprehensive understanding.

Figure 1:
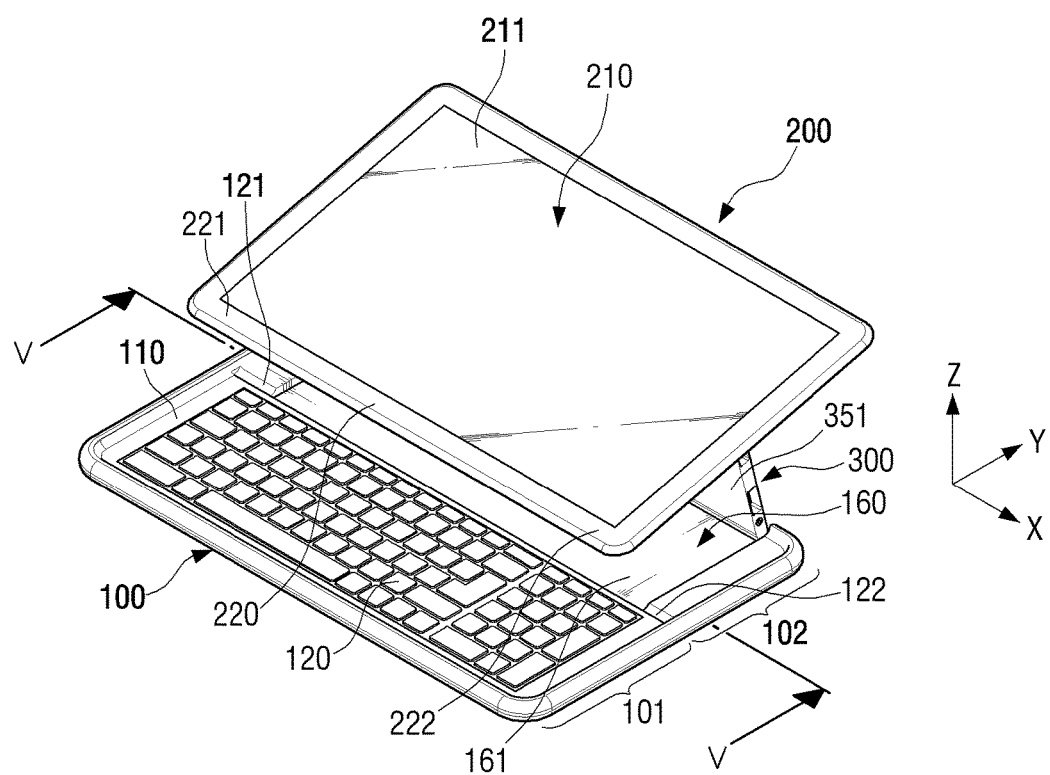
FIG. 1 is a perspective view illustrating a portable device according to an embodiment of the present disclosure.
Figure 2:
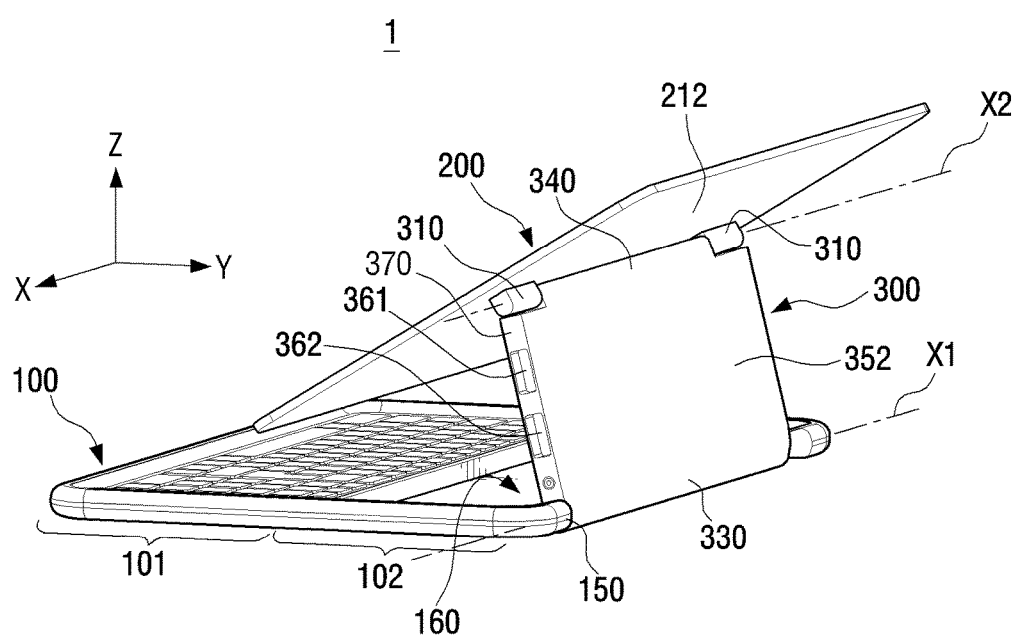
FIG. 2 is a perspective view illustrating the portable device of FIG. 1 as seen from a different angle.
Figure 3:
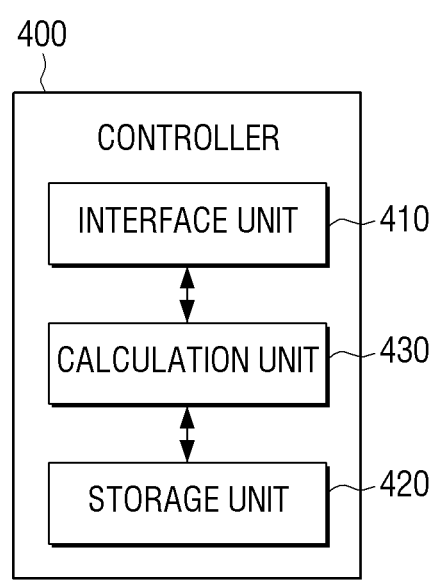
FIG. 3 is a block diagram conceptually illustrating a controller equipped with the portable device of FIG. 1.
Figure 4A:
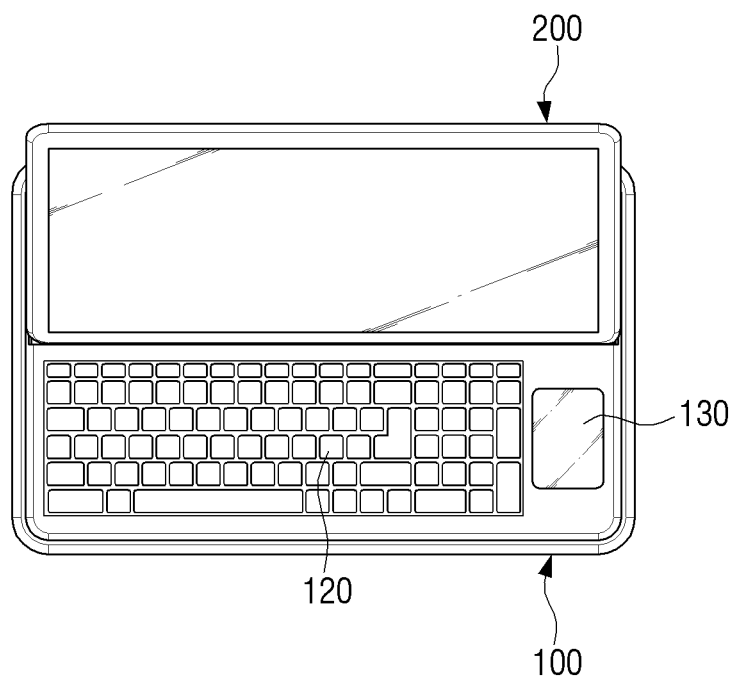
FIGS. 4A, 4B and 4C are plan views illustrating various examples of a keyboard unit equipped with the portable device of FIG. 1.
Figure 4B:
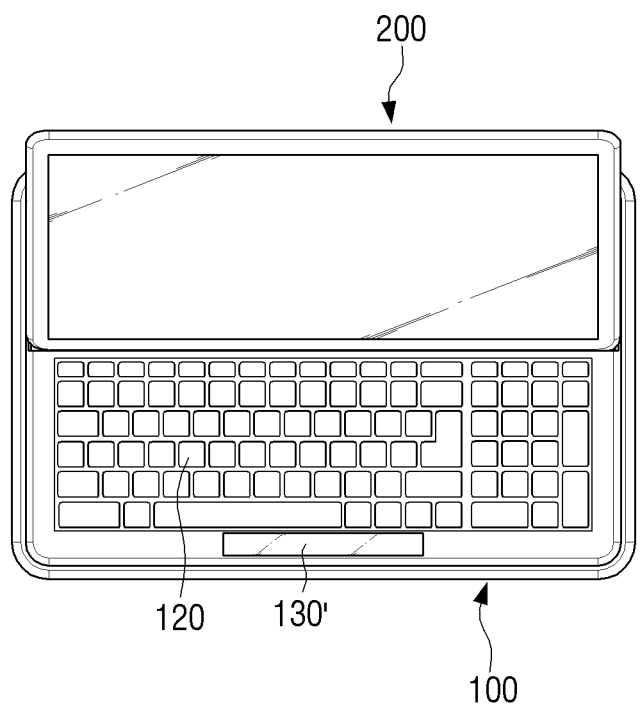
Figure 4C:
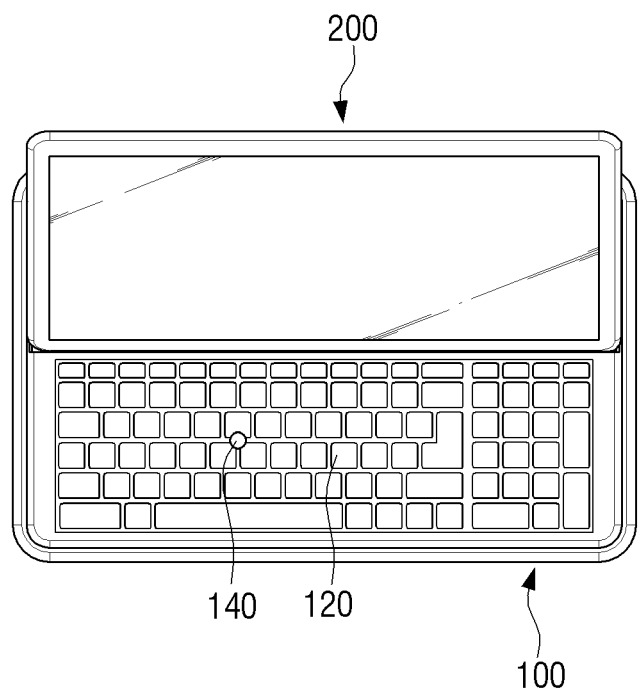
Figure 5A:
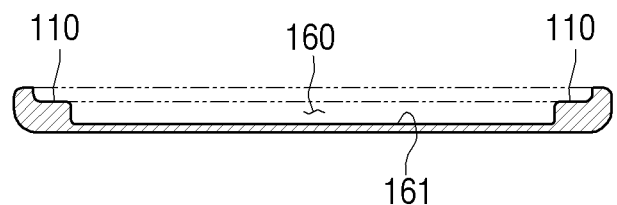
FIG. 5A is a sectional view illustrating the portable device of FIG. 1 taken along a line V-V in FIG. 1.
Figure 5B:
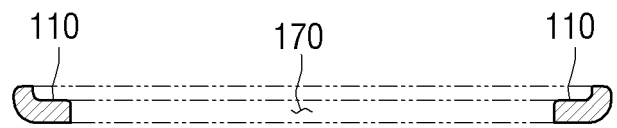
FIG. 5B is a sectional view illustrating an alternative embodiment of the portable device of FIG. 5A.

FIG. 1 is a perspective view illustrating a portable device according to an exemplary embodiment of the present disclosure; FIG. 2 is a perspective view illustrating the portable device of FIG. 1 as seen from a different angle. FIG. 3 is a block diagram conceptually illustrating a controller equipped with the portable device of FIG. 1; FIGS. 4A, 4B and 4C are plan views illustrating various examples of a keyboard unit equipped with the portable device of FIG. 1. FIG. 5A is a sectional view illustrating the portable device of FIG. 1 taken along a line V-V in FIG. 1; FIG. 5B is a sectional view illustrating an alternative embodiment of the portable device of FIG. 5A.

Referring to FIGS. 1, 2, and 3, a portable device 1 according to an embodiment of the present disclosure is an electronic device to be easily carried when a user requires to bring the device 1 from one location to another, as well as to be used in a specific place in a stationary manner. The portable device 1 may include a keyboard unit 100, a display unit 200, a connection unit 300, and a controller 400.

The keyboard unit 100 has a substantially rectangular plate shape. The keyboard unit 100 includes a plurality of input keys 120 which are exposed to a top surface 110 of the keyboard unit 100 and are in the form of buttons. The user may easily perform tasks such as text input, web surfing, etc., by using the input keys 120.

Alternatively, as illustrated in FIG. 4A, the keyboard unit 100 may be equipped with a touch pad 130 that is placed on a right side of the keyboard unit 100 with the input keys 120. As illustrated in FIG. 4B, the keyboard unit 100 may be equipped with a touch pad 130' that is placed below the keyboard unit 100 with the input keys 120. As illustrated in FIG. 4C, the keyboard unit 100 may be equipped with a pointing stick 140 instead of the touch pad with the input keys 120.

The display unit 200 may have a substantially rectangular plate shape. The display unit 200 is provided with a touch screen 210 on a front surface 211 of the display unit 200. The touch screen 210 functions as an input means by a user touch as well as an image display means.

The display unit 200 may have various arrangements with respect to the keyboard unit 100 depending on user selection. In detail, the display unit 200 may be placed in a first arrangement to cover the keyboard unit 100 or a second arrangement to uncover the keyboard unit 100 (or not to cover the keyboard unit 100) by a user operation of moving the display unit 200 with respect to the key board unit 100. Appearance of the portable device 1 in the first and second arrangements will be described in detail later with reference to FIGS. 6 to 10.

When the display unit 200 is placed in the first arrangement to cover the keyboard unit 100, the display unit 200 is placed to overlap the keyboard unit 100. Accordingly, the input keys 120 of the keyboard unit 100 are hidden by the display unit 200, and thus the input keys 120 cannot be used. However, the touch screen 210 of the display unit 200 remains exposed, and thus can be used. Here, when the display unit 200 is placed in this first described arrangement, the portable device 1 has a shape similar to a normal tablet computer. Accordingly, when the display unit 200 is placed in this first arrangement, the mode of the portable device 1 is referred to as a tablet mode.

When the display unit 200 is placed in the second arrangement not to cover the keyboard unit 100, the touch screen 210 of the display unit 200 is maintained in the exposed (viewable) state so that the touch screen 210 can be used, and the keyboard unit 100 also can be used because the input keys 120 of the keyboard unit 100 are not covered by the display unit 200. Accordingly, when the display unit 200 is placed in the second described arrangement, the portable device 1 may have a form similar to a normal notebook computer. Therefore, when the display unit 200 is placed in the second described arrangement, the mode of the portable device 1 is referred to as a notebook mode.

When the portable device 1 is used in the notebook mode, a lower end 220 of the display unit 200 can be inserted into at least one fixing groove formed on a top surface 110 of the keyboard unit 100 so that the position of the display unit 200 may be fixed. In more detail, a first fixing groove 121 and a second fixing groove 122 are formed on the top surface 110 of the keyboard unit 100, and spaced apart from each other approximately as far from each other as a width of the display unit 200. In other words, the first fixing groove 121 may be placed at a left side of the keyboard unit 100 while the second fixing groove 122 may be placed at a right side of the keyboard unit 100. A left lower end 221 and a right lower end 222 of the display unit 200 may be inserted into the first fixing groove 121 and the second fixing groove 122, respectively.

The first and second fixing grooves 121 and 122 may be concavely formed on the top surface 110 of the keyboard unit 100. However, other shapes of the fixing grooves 121 and 122 may be provided to correspond to the shapes of the left lower end 221 and a right lower end 222. The first and second fixing grooves 121 and 122 may be formed to be inclined at a predetermined angle (e.g. 50°, 60°, 70°, etc.) with respect to the top surface 110 of the keyboard unit 100. In other words, the first and second fixing grooves 121 and 122 may be formed to be inclined at the predetermined angle with respect to a Y direction across the keyboard unit 100. Accordingly, when the portable device 1 is used in the notebook mode, if the lower end 220 of the display unit 200 is inserted in the first and second fixing grooves 121 and 122, the display unit 200 may be maintained with the same inclination angle as the inclination angles of the first and second fixing grooves 121 and 122 with respect to the keyboard unit 100. The inclination angle may be variously selected depending on the design.

The keyboard unit 100 may be divided into a first area 101 equipped with the input keys 120 and a second area 102 equipped with no input keys 120, in a direction (namely, Y direction) which is perpendicular to rotation axes X1 and X2 as illustrated in FIG. 2 and parallel to the keyboard unit 100. Here, the first area 101 is placed in a front side of the keyboard unit 100, and the second area 102 is placed in a rear of the first area 101 as the first area 101 is positioned closest to a user. In the present embodiment, an area of the first area 101 is almost the same as that of the second area 102. The above-described first and second fixing grooves 121 and 122 are placed in a boundary area between the first area 101 and the second area 102. Accordingly, when the lower end 220 of the display unit 200 is inserted into the first and second fixing grooves 121 and 122, the lower end 220 of the display unit 200 is placed approximately at the center of the keyboard unit 100 (see, for example, FIG. 6).

The connection unit 300 supports the display unit 200 so that display unit 200 can be manipulated to cover or uncover the keyboard unit 100. The connection unit 300 is connected to each of the keyboard unit 100 and the display unit 200 so that the connection unit 300 can be moved relatively with respect to the each of the keyboard unit 100 and the display unit 200.

In more detail, the connection unit 300 and the keyboard unit 100 are rotatably connected to each other and can each rotate relatively around a first rotation axis X1. The connection unit 300 and the display unit 200 are rotatably connected to each other and can each rotate relatively around a second rotation axis X2 parallel to the first rotation axis X1. The use mode switch (from the tablet mode to the notebook mode or from the notebook mode to the tablet mode) of the portable device 1 may be provided by and activated by the relative rotation between the connection unit 300 and the keyboard unit 100 and the relative rotation between the connection unit 300 and the display unit 200.

The connection unit 300 and the keyboard unit 100 are hinge-connected to each other to allow the relative rotation between the connection unit 300 and the keyboard unit 100, and the connection unit 300 and the display unit 200 are hinge-connected to each other to allow the relative rotation between the connection unit 300 and the display unit 200. Here, the hinge connection between the connection unit 300 and the keyboard unit 100 is performed by a first hinge unit (not illustrated), and the hinge connection between the connection unit 300 and the display unit 200 is performed by a second hinge unit 310 (see FIG. 2). The first hinge unit not illustrated in the accompanying figures may have the same structure as that of the second hinge unit 310. Alternatively, each of the hinge units may use various types of conventional hinge structures which provide the intended purposes as described herein.

As illustrated in FIG. 2, a first end 330 of the connection unit 300 is connected to a top end 150 of the keyboard unit 100 by the first hinge unit (not illustrated). A second end 340 of the connection unit 300 is connected to a rear surface 212 of the display unit 200 by the second hinge unit 310. Also illustrated in FIG. 2, the second end 340 of the connection unit 300 may be connected approximately to a center of the rear surface 212 of the display unit 200.

The first hinge unit and the second hinge unit 310 may have a free stop function. Accordingly, when the connection unit 300 is placed at some angle with respect to the keyboard unit 100 by the user manipulation, the connection unit 300 may maintain the angle set with respect to the keyboard unit 100 unless a force exceeding a threshold value is applied to the connection unit 300. Similarly, when the display unit 200 is placed at some angle with respect to the connection unit 300 by the user manipulation, the display unit 200 may maintain the angle set with respect to the connection unit 300 unless a force exceeding a threshold value is applied to the display unit 200. As illustrated in FIG. 2, the display unit 200 may remain in a floating position above the keyboard unit 100 by the free stop function of the first and second hinges until the force exceeding the threshold value is applied to pivot the display unit 200.

When the display unit 200 is placed in the first arrangement to cover the keyboard unit 100 (namely, when the portable device 1 is used in the tablet mode), the connection unit 300 is received in a receiving groove 160 formed in the second area 102 (see FIG. 1) of the keyboard unit 100. Referring to FIGS. 1 and 5A, the receiving groove 160 has a form corresponding to the connection unit 300 having a substantially rectangular plate shape, and a bottom surface 161 to face a front surface 351 of the connection unit 300 to be received within the receiving groove 160. On the other hand, when the display unit 200 is placed in the second arrangement to uncover the keyboard unit 100 (namely, when the portable device 1 is used in the notebook mode), the connection unit 300 is rotated around the first rotation axis (X1) so as to be placed outside the receiving groove 160.

As illustrated in FIG. 5B, the keyboard unit 100 may be provided with a receiving hole 170 with open top and bottom surfaces instead of the above-described receiving groove 160 to receive the connection unit 300. When the receiving hole 170 is provided, there are advantages including that the keyboard unit 100 has a slimmer thickness and heat generated by the connection unit 300 may be emitted better as compared with the receiving groove 160.

The connection unit 300 may include at least one input and output port to send and receive data with external devices. As illustrated in FIG. 2, in the present embodiment, two input and output ports 361 and 362 are provided in an edge surface 370 of the connection unit 300. The type and number of the input and output ports 361 and 362 may be changed variously according to requirements of different exemplary embodiments.

As illustrated in FIG. 3, a controller 400 is configured to control operations of the portable device 1, and is disposed inside the above-described connection unit 300. The portable device 1 according to the present embodiment is distinguished from other existing portable devices in that the controller 400 is placed inside the connection unit 300.

Also as illustrated in FIG. 3, the controller 400 may include an interface unit 410, a storage unit 420, and a calculation unit 430. The interface unit 410 performs interfacing between the keyboard unit 100 and the display unit 200. The storage unit 420 stores programs required for operation of the portable device 1, and the calculation unit 430 executes the programs to control the operation of the portable device 1.

Hereinafter, operations of the portable device 1 as described above will be described in more detail with reference to FIGS. 6 to 10.

Figure 6:
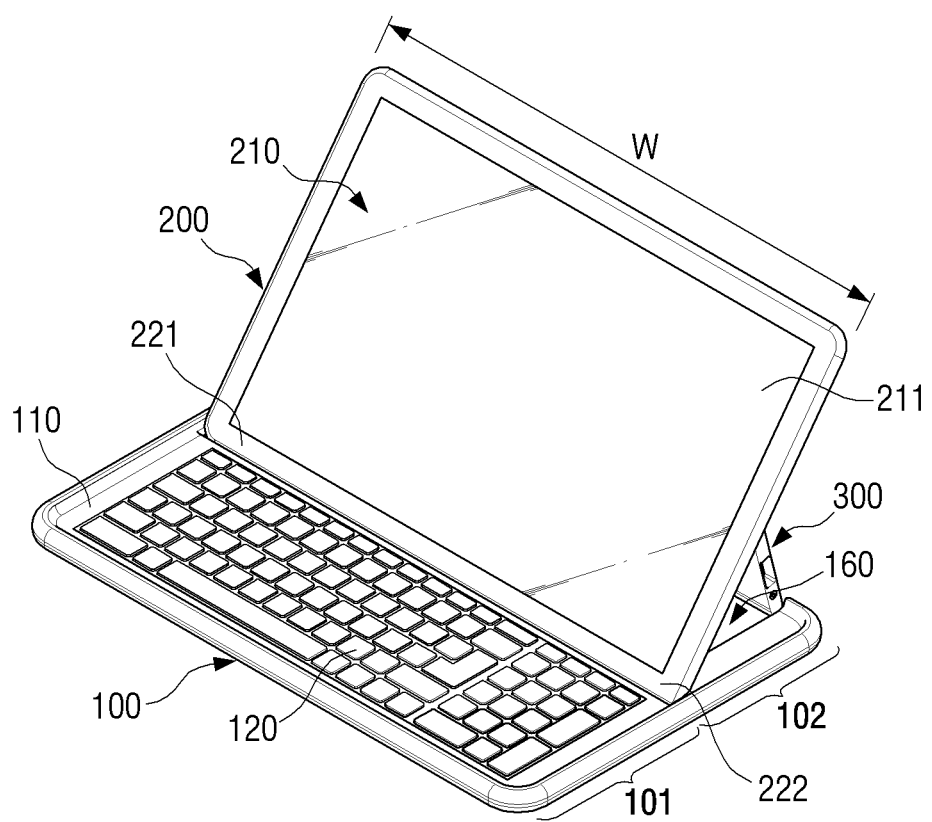
FIG. 6 is a perspective view illustrating an arrangement of the portable device of FIG. 1 when the portable device is used in a notebook mode.
Figure 7:
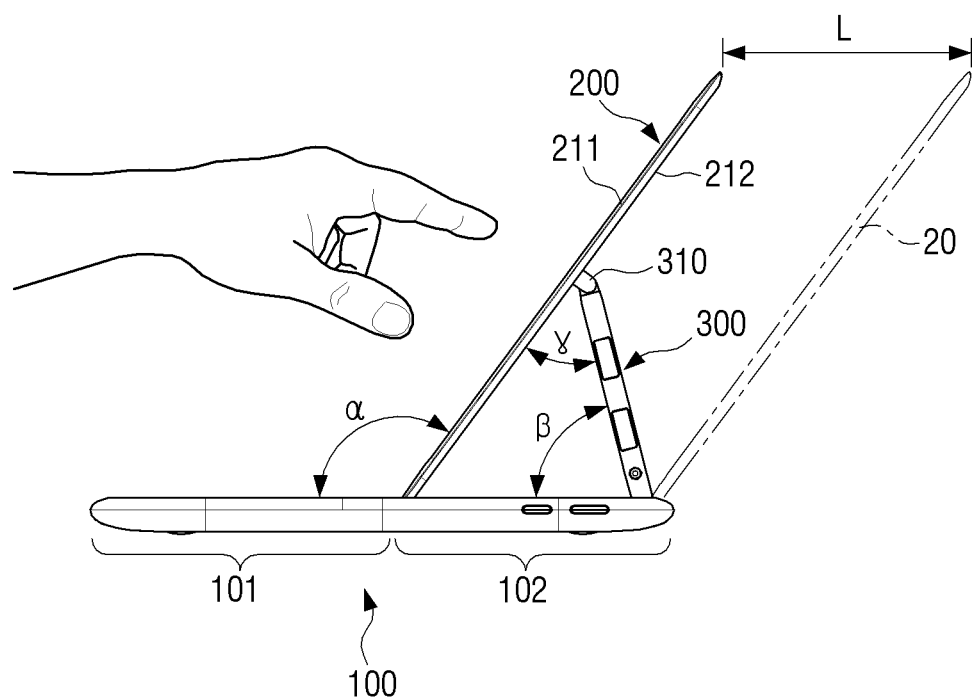
FIG. 7 is a side view illustrating the portable device of FIG. 6.
Figure 8:
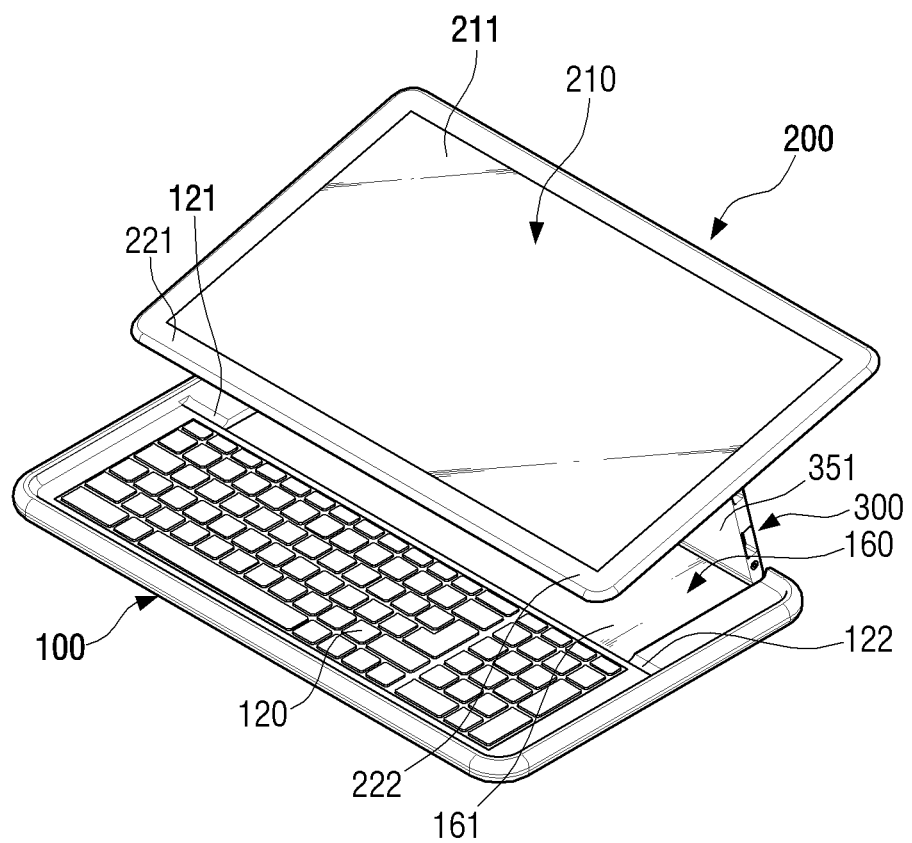
FIG. 8 is a perspective view illustrating another arrangement of the portable device of FIG. 1 when the portable device is used in a notebook mode.
Figure 9:
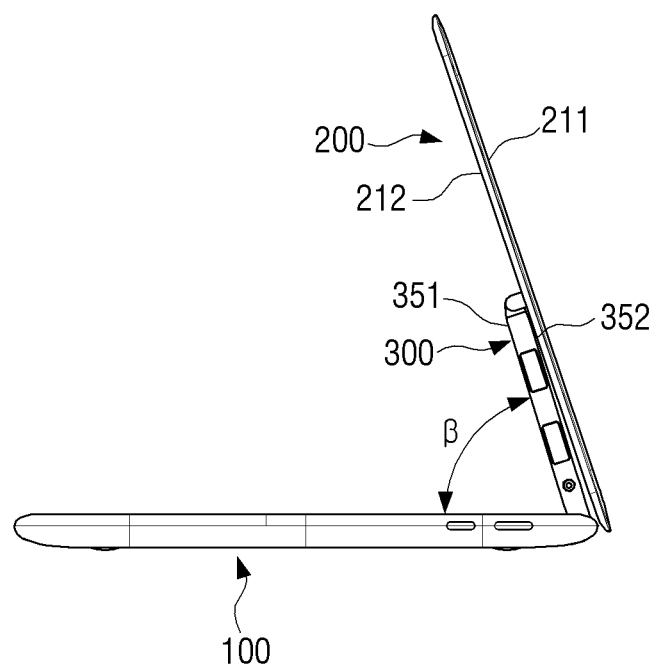
FIG. 9 is a side view illustrating still another arrangement of the portable device of FIG. 1 when the portable device is used in a notebook mode.
Figure 10:
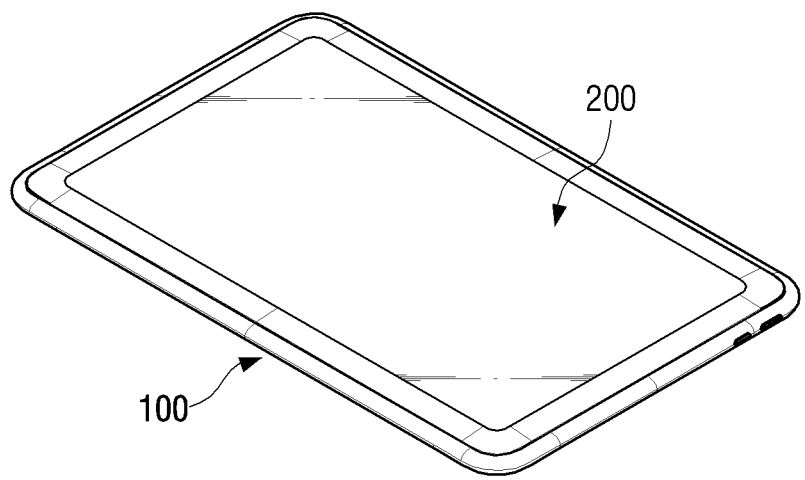
FIG. 10 is a perspective view illustrating the portable device of FIG. 1 when the portable device is used in a tablet mode.

FIG. 6 is a perspective view illustrating an arrangement of the portable device of FIG. 1 when the portable device is used in a notebook mode, FIG. 7 is a side view illustrating the portable device of FIG. 6. FIG. 8 is a perspective view illustrating another arrangement of the portable device of FIG. 1 when the portable device is used in a notebook mode, and FIG. 9 is a side view illustrating still another arrangement of the portable device of FIG. 1 when the portable device is used in a notebook mode. FIG. 10, on the other hand, is a perspective view illustrating the portable device of FIG. 1 when the portable device is used in a tablet mode.

First, FIGS. 6 and 7 will be explained.

When the portable device 1 is used in the notebook mode (namely, the display unit 200 is placed in the second arrangement not to cover the keyboard unit 100), the portable device 1 may have a first front viewing arrangement as illustrated in FIGS. 6 and 7.

In the first front viewing arrangement, an angle $\alpha$ between the first area 101 of the keyboard unit 100 and the display unit 200 is an obtuse angle, and an angle $\beta$ between the connection unit 300 and the keyboard unit 100 and an angle $\gamma$ between the display unit 200 and the connection unit 300 are both an acute angle. For example, $\alpha=120°$, and $\beta=\gamma=60°$. However, $\alpha$, $\beta$, and $\gamma$ may be set differently depending on the embodiments.

In the first front viewing arrangement, since the input keys 120 of the keyboard unit 100 are not covered by the display unit 200, but are exposed externally, the user can use the keyboard unit 100 for tasks such as text input, web surfing, etc. Also, since the touch screen 210 of the display unit 200 is placed to face the front, the user may view the touch screen 210 from the front, and also may perform an input task through the touch screen 210.

In the first front viewing arrangement, the left lower end 221 and right lower end 222 of the display unit 200 can be inserted into the first fixing groove 121 (see FIG. 1) and the second fixing groove 122 (see FIG. 1) of the keyboard unit 100, respectively, thereby being maintained in a fixed state. Referring to FIG. 7, since the first and second fixing grooves 121 and 122 are placed at the boundary area between the first area 101 and the second area 102 of the keyboard unit 100 as described above, compared with a display unit of the conventional notebook computer (see dotted outline illustrating the positioning of a conventional display 20), the display unit 200 according to the present embodiment is placed closer to the user by an approximate distance corresponding to the length L of the second area 102. Accordingly, when the portable device 1 is used in the notebook mode, touching the touch screen 210 is easier so the user is less likely to become fatigued due to having to extend a further distance to access and view the touch screen 210.

Also, in the first front watching arrangement, since the display unit 200 is supported by the connection unit 300 having almost the same width as the width W of the display unit 200, and the first hinge unit (not illustrated) and the second hinge unit 310 have the free stop functions, even if the user touches the touch screen 210, the display unit 200 is not moved, but may be maintained stably at any predetermined position.

Also, in the first front viewing arrangement, since the connection unit 300 is placed in an inclined manner with respect to the keyboard unit 100, external surfaces of the connection unit 300 are exposed externally. Accordingly, heat generated in the connection unit 300 may be emitted outwardly more efficiently so that various electronic components configuring the controller 400 that are placed in the connection unit 300 may be prevented from being damaged by the heat.

Next, FIG. 8 will be described.

When the portable device 1 is used in the notebook mode (namely, the display unit 200 is placed in the second arrangement not to cover the keyboard unit 100), the portable device 1 may have a second front viewing arrangement as illustrated in FIG. 8.

In this exemplary embodiment, the left and right lower ends 221 and 222 of the display unit 200 are separated from the first and second fixing grooves 121 and 122, and then the connection unit 300 and the display unit 200 are rotated slightly in the clockwise direction around the first and second rotation axes X1 and X2 so that the portable device 1 may be switched from the first front viewing arrangement as illustrated in FIGS. 6 and 7 to the second front viewing arrangement as illustrated in FIG. 8.

In the second front viewing arrangement, the display unit 200 is supported by the connection unit 300, and the connection unit 300 is supported by the keyboard unit 100. The connection unit 300 and the display unit 200 may be maintained in the fixed status by the free stop function of the first hinge unit (not illustrated) and the second hinge unit 310, as described above. Accordingly, if the user does not apply a force that exceeds the threshold value to the display unit 200 when using the touch screen, the display unit 200 and the connection unit 300 are maintained in the fixed status without movement.

The second front viewing arrangement is the same as the first front viewing arrangement as described above in that both the input keys 120 of the keyboard unit 100 and the touch screen 210 of the display unit 200 can be used. However, the second front viewing arrangement is distinguished from the above-described first front viewing arrangement in that the left and right lower ends 221 and 222 of the display unit 200 are not inserted into the first and second fixing grooves 121 and 122 of the keyboard unit 100, but instead are separated from each other and are exposed externally.

In the second front viewing arrangement, since the external surfaces of the connection unit 300 are also exposed externally, the heat generated in the connection unit 300 may be emitted more efficiently so that various electronic components configuring the controller 400 that is built in the connection unit 300 may be prevented from being damaged by the heat.

Next, FIG. 9 will be described.

When the portable device 1 is used in the notebook mode (namely, the display unit 200 is placed in the second arrangement not to cover the keyboard unit 100), the portable device 1 may have a rear viewing arrangement as illustrated in FIG. 9.

The portable device 1 may be switched from the second front viewing arrangement as illustrated in FIG. 8 to the rear viewing arrangement as illustrated in FIG. 9 by further rotating the display unit 200 in the clockwise direction (relative to a viewing angle of FIGS. 2, 8 and 9) around the second rotation axis X2 (see FIG. 2) until a rear surface 212 of the display unit 200 is in contact with a rear surface 352 of the connection unit 300. Here, the angle between the connection unit 300 and the keyboard unit 100 may be set variously by rotation of the connection unit 300 around the first rotation axis X1 (see FIG. 2).

In the rear viewing arrangement, the display unit 200 is supported by the connection unit 300, and the connection unit 300 is supported by the keyboard unit 100. The connection unit 300 and the display unit 200 may be maintained in the fixed status by the free stop function of the first hinge unit (not illustrated) and the second hinge unit 310. Accordingly, if the user does not apply a force that exceeds the threshold value to the display unit 200 when using the touch screen, the display unit 200 and the connection unit 300 are kept in the fixed status without movement.

The rear watching arrangement is the same as the front viewing arrangements as described above in that both the input keys 120 of the keyboard unit 100 and the touch screen 210 of the display unit 200 can be used. However, the rear viewing arrangement is distinguished from the front viewing arrangements as described above in that the touch screen 210 can be used by another user located at the rear of the portable device 1 rather than the user located in front of the portable device 1 since the front surface 211 of the display unit 200 with the touch screen 210 faces the rear. Accordingly, when a first user located in front of the portable device 1 wants to show the touch screen 210 to a second user located at the rear of the portable device 1, the rear viewing arrangement may be used conveniently.

On the other hand, when the display unit 200 is switched from the front viewing arrangement to the rear viewing arrangement, the controller 400 reverses the top and bottom of an image which is being displayed on the touch screen 210. In other words, the controller 400 rotates the image being displayed on the touch screen 210 such that the image is rotated by 180 degrees along with the display unit 200. Likewise, when the display unit 200 is switched from the rear viewing arrangement to the front viewing arrangement, the controller 400 reverses the top and bottom of the image which is being displayed on the touch screen 210. A position sensor (not illustrated) may be disposed in the display unit 200 to detect the arrangement switching of the display unit 200. The controller 400 determines whether to reverse the position of the top and bottom of the image (rotate the image) based on an arrangement switching signal to be provided by the position sensor.

In the rear viewing arrangement, since the other external surfaces of the connection unit 300 except the rear surface are exposed externally, the heat generated in the connection unit 300 may be emitted efficiently so that various electronic components configuring the controller 400, which is disposed in the connection unit 300, may be prevented from being damaged by the heat.

Next, FIG. 10 will be described.

When the portable device 1 is used in the tablet mode (namely, the display unit 200 is placed in the first arrangement to cover the keyboard unit 100), the portable device 1 may have a shape as illustrated in FIG. 10.

The portable device 1 may be switched from the notebook mode to the tablet mode by switching the display unit 200 from the second front viewing arrangement as illustrated in FIG. 8 or the rear viewing arrangement as illustrated in FIG. 9 to the arrangement as illustrated in FIG. 10.

When being changed from the second front viewing arrangement as illustrated in FIG. 8 to the arrangement as illustrated in FIG. 10, the connection unit 300 is rotated in the counterclockwise direction (relatively with respect to the viewing angle of FIGS. 2, 8 and 9) until the connection unit 300 is received inside the receiving groove 160 of the keyboard unit 100, and the display unit 200 is rotated in the clockwise direction until the rear surface 212 of the display unit 200 is in contact with the rear surface 352 of the connection unit 300 so that the use mode of the portable device 1 may be switched to the tablet mode as illustrated in FIG. 10.

Also, when being changed from the rear viewing arrangement as illustrated in FIG. 9 to the arrangement as illustrated in FIG. 10, the connection unit 300 is rotated in the counterclockwise direction until the connection unit 300 is received inside the receiving groove 160 of the keyboard unit 100 without relative movement between the display unit 200 and the connection unit 300 so that the use mode of the portable device 1 may be switched to the tablet mode as illustrated in FIG. 10.

In the tablet mode, the angle α between the keyboard unit 100 and the display unit 200 and the angle γ between the display unit 200 and the connection unit 300 are 180°, respectively. The angle β between the connection unit 300 and the keyboard unit 100 is 0°.

In the tablet mode, the display unit 200 is supported by the connection unit 300 and keyboard unit 100, and the connection unit 300 is supported by the keyboard unit 100. The connection unit 300 and the display unit 200 may be maintained in the fixed status by the free stop function of the first hinge unit (not illustrated) and the second hinge unit 310.

In the tablet mode, since the keyboard unit 100 is covered by the display unit 200, the input keys 120 of the keyboard unit 100 cannot be used, but the touch screen 210 of the display unit 200 is exposed so as to be accessed and used.

On the other hand, when the user wants to switch the portable device 1 from the tablet mode as illustrated in FIG. 10 to one of the notebook modes as illustrated in FIGS. 6, 8 and 9, the user separates the display unit 200 slightly from the keyboard unit 100, and then adjusts properly the above-described angles α, β, and γ by rotating the connection unit 300 and the display unit 200 around the first and second rotation axes X1 and X2. Because the switching principle from the tablet mode to the notebook mode may be easily understood from the above-described switching principle from the notebook mode to the tablet mode, a detailed description thereof will be omitted.

As described above, the portable device 1 according to an embodiment of the present disclosure may be placed in the notebook mode or the tablet mode depending on the user selection. In the notebook mode, the display unit 200 may be set in the front viewing arrangement or the rear viewing arrangement. In the front or rear viewing arrangement, the display unit 200 may be stably supported by the connection unit 300.

Also, the portable device 1 according to an embodiment of the present disclosure is distinguished from the conventional portable devices in that the controller 400 is placed inside the connection unit 300. Since the controller 400 is placed inside the connection unit 300, electronic components configuring the controller 400 may effectively be prevented from the heat, especially when the portable device 1 is used in the notebook mode.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A portable device comprising:
    a keyboard unit;
    a display unit;
    a connection unit to be connected to each of the keyboard unit and the display unit, to move relatively with respect to each of the keyboard unit and the display unit, and to support the display unit so that the display unit covers or uncovers the keyboard unit,
    wherein the connection unit is configured to be placed in a receiving hole to the keyboard unit while the display unit covers the keyboard unit and the connection unit, thereby allowing heat to dissipate to air out of a bottom surface of the connection unit; and
    a processor disposed inside the connection unit and to execute a program to control operations of the portable device, and the processor including an interface unit, a calculation unit, and a storage unit,
    wherein the dissipated heat is generated by the processor.

2. The portable device of claim 1, wherein the display unit is placed in a first arrangement to cover the keyboard unit or a second arrangement to uncover the keyboard unit depending on a user selection.

3. The portable device of claim 2, wherein
    a touch screen is equipped in a front surface of the display unit, and
    when the display unit is placed in each of the first arrangement and the second arrangement, the touch screen is maintained in a viewable state.

4. The portable device of claim 3, wherein
    the connection unit is connected to the keyboard unit and can be rotated around the keyboard unit via a first rotation axis, and
    the display unit is connected to the connection unit and can be rotated around the connection unit via a second rotation axis parallel that is to the first rotation axis.

5. The portable device of claim 4, wherein
    the connection unit is hinge-connected to the keyboard unit, and
    the display unit is hinge-connected to the connection unit.

6. The portable device of claim 4, wherein when the display unit is placed in the second arrangement, the connection unit is placed inclinedly with respect to the keyboard unit so that external surfaces of the connection unit are exposed externally.

7. The portable device of claim 4, wherein a top surface of the keyboard unit comprises at least one fixing groove in which a lower end of the display unit is inserted when the display unit is placed in the second arrangement.

8. The portable device of claim 7, wherein the at least one fixing groove comprises:
    a first fixing groove in which a left lower end of the display unit is inserted; and
    a second fixing groove in which a right lower end of the display unit is inserted.

9. The portable device of claim 7, wherein
    the keyboard unit is divided into a first area and a second area in a direction parallel to the keyboard unit and vertical to the first rotation axis, the first area is equipped with input keys of the keyboard unit, and the second area is not equipped with the input keys, and
    the at least one fixing groove is placed at a boundary area between the first area and the second area.

10. The portable device of claim 4, wherein
    the second arrangement of the display unit comprises
    a front viewing arrangement in which the touch screen can be viewed from a front side of the portable device, and
    a rear viewing arrangement in which the touch screen can be viewed from a rear side of the portable device.

11. The portable device of claim 10, wherein
    when the display unit is switched from the front viewing arrangement to the rear viewing arrangement or when the display unit is switched from the rear viewing arrangement to the front viewing arrangement, the processor reverses the top and bottom of an image that is being displayed on the touch screen.

12. The portable device of claim 10, wherein
    when the display unit is placed in the rear viewing arrangement, a rear surface of the display unit is in contact with a rear surface of the connection unit.

13. The portable device of claim 4, wherein
    one end of the connection unit is connected to an end of the keyboard unit, and the other end of the connection unit is connected to a center portion of a rear surface of the display unit.

14. The portable device of claim 1,
    wherein the interface unit is configured to perform interfacing with the keyboard unit and the display unit,
    wherein the storage unit stores programs required for the operations of the portable device; and
    wherein the calculation unit executes the programs to control the operations of the portable device.

15. The portable device of claim 1, wherein the connection unit comprises at least one input and output port to send and receive data with at least one external device.

* * * * *